United States Patent
Girroir et al.

(10) Patent No.: US 7,762,140 B2
(45) Date of Patent: Jul. 27, 2010

(54) COMBINED FLUID PRESSURE AND TEMPERATURE SENSOR APPARATUS

(75) Inventors: Jared E. Girroir, Attleboro, MA (US); Nicholas Moelders, Norton, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 63 days.

(21) Appl. No.: 12/332,401

(22) Filed: Dec. 11, 2008

(65) Prior Publication Data
US 2009/0178487 A1 Jul. 16, 2009

Related U.S. Application Data

(60) Provisional application No. 61/020,227, filed on Jan. 10, 2008.

(51) Int. Cl.
*G01L 7/00* (2006.01)
(52) U.S. Cl. ...................... 73/714; 361/283.4
(58) Field of Classification Search ............. None
See application file for complete search history.

(56) References Cited

U.S. PATENT DOCUMENTS

| | | | |
|---|---|---|---|
| 3,597,974 A * | 8/1971 | Black et al. | 374/118 |
| 4,716,492 A | 12/1987 | Charboneau et al. | |
| 4,982,351 A | 1/1991 | Kawate et al. | |
| 5,436,795 A * | 7/1995 | Bishop et al. | 361/283.4 |
| 5,486,976 A * | 1/1996 | Charboneau et al. | 361/283.4 |
| 5,499,158 A * | 3/1996 | Bishop et al. | 361/283.4 |
| 5,974,893 A | 11/1999 | Balcarek et al. | |

* cited by examiner

*Primary Examiner*—Andre J Allen
(74) *Attorney, Agent, or Firm*—Russell E. Baumann

(57) ABSTRACT

A combined fluid pressure transducer and temperature sensor (10) has a housing (12) containing a variable capacitor (14) having a rigid substrate (14a) and attached flexible diaphragm (14b) in sealed, spaced apart relation. The capacitor is mounted in the housing so that the outer face surface of the diaphragm is exposed to a fluid pressure chamber (12k). A temperature responsive sensor element (28) is disposed on the outer face surface of the diaphragm and covered by a thin protective layer. A fluid flow diffuser (30) is disposed in the fluid pressure port (12b) for directing fluid flow across the temperature sensor.

16 Claims, 3 Drawing Sheets

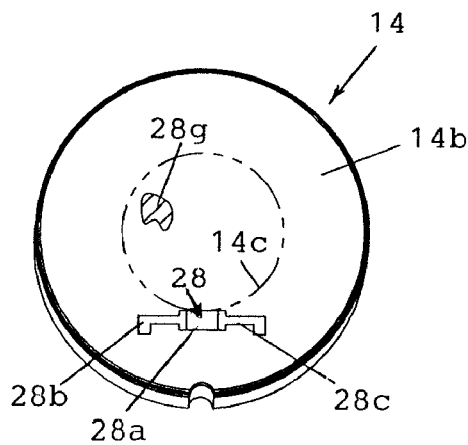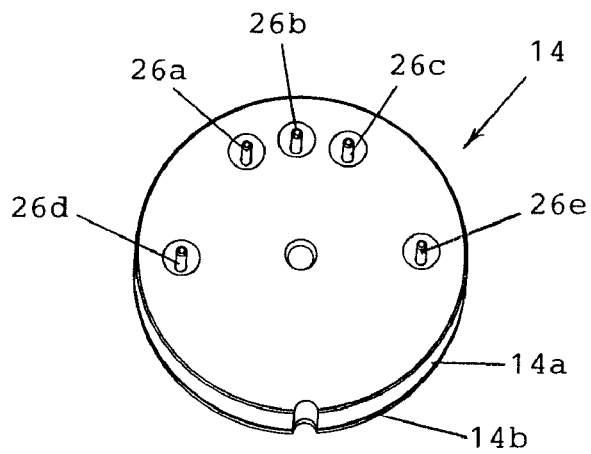
Fig. 3          Fig. 4
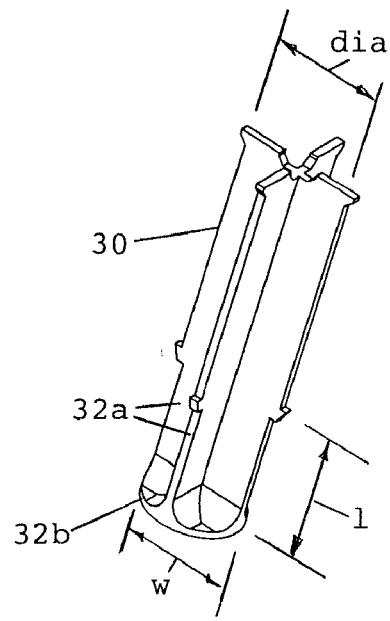
Fig. 5

COMBINED FLUID PRESSURE AND TEMPERATURE SENSOR APPARATUS

Benefit is claimed under 35 USC Section 119 (e) (1) of U.S. Provisional Application No 61/020,227, filed Jan. 10, 2008.

FIELD OF THE INVENTION

This invention relates generally to condition responsive fluid sensors and more particularly to combined fluid pressure and temperature sensors.

BACKGROUND OF THE INVENTION

Fluid pressure responsive capacitive transducers comprising a variable capacitor mounted in a fluid chamber having a thin ceramic diaphragm exposed to the fluid so that a change in fluid pressure causes concomitant changes in the position of the diaphragm to thereby cause change in the capacitance of the capacitor are well known in the art. Transducers of this type are shown and described, for example, in U.S. Pat. No. 4,716,492, the subject matter of which is incorporated herein by this reference. In that patent, a thin ceramic diaphragm is shown mounted in closely spaced, sealed, overlying relation to a ceramic substrate. Metal coatings are deposited on opposing surfaces of the diaphragm and substrate to serve as capacitor plates arranged in predetermined closely spaced relation to each other to form a capacitor. Capacitor terminal pins having one end connected to the capacitor plates are mounted in bores extending through the substrate with opposite ends connected to signal conditioning circuitry disposed in an electric circuit chamber at an opposite face surface of the substrate. A connector body of electrical insulating material, received over the signal conditioning circuitry, mounts transducer terminals extending into the electric circuit chamber for connection to the signal conditioning circuitry. Capacitance is converted by the circuitry to an output voltage related to the fluid pressure. The capacitor is received in a suitable housing having a fluid receiving port and is provided with a fluid seal enabling the transducer to be used with fluid pressures up to 10,000 psi or higher.

In certain applications it is desirable to measure temperature of fluid as well as pressure. A combined pressure responsive transducer and temperature sensor is shown and described in U.S. Pat. No. 5,974,893, the subject matter of which is incorporated herein by this reference. In that patent a variable capacitor having a rigid substrate and a flexible diaphragm, each provided with a capacitor plate on a respective face surface, are attached to each other in aligned, overlying, spaced apart relation by a generally annular glass seal. The variable capacitor is disposed in a housing with the diaphragm exposed to fluid in a fluid pressure chamber of the housing that is in fluid communication with a fluid pressure receiving port of the housing. Electrical traces extend from the capacitor plates into an enclosed window in the glass seal for electrical connection with electrical pins extending through the substrate. A temperature responsive element is mounted for direct engagement with electrical leads that extend through an opening in the diaphragm near its outer periphery aligned with the glass seal.

Temperature sensor pins extend through the substrate and are connected to respective connection pads. The other ends of the temperature sensor pins, as well as the electrical pins for the variable capacitor, are connected to signal conditioning circuitry provided in an electric circuit chamber formed between the housing and a connector body attached to the housing. In one embodiment a temperature responsive element such as a thick film thermistor is coated onto the exposed face of the diaphragm along with electrically conductive traces connected to the connection pads. Other embodiments have the thermistor disposed within a fluid receiving port of the housing or disposed beyond the port with or without a protective sheath.

Each of the above embodiments of the U.S. Pat. No. 5,974,893 patent have certain limitations. With respect to the embodiment having the thermistor coated onto the exposed face of the diaphragm, it is desirable to reduce the response time of the temperature sensor and to provide a temperature sensor that has enhanced environmental compatibility, that is, a sensor that has greater immunity to the corrosivity of the media to which it is exposed. With regard to mounting the thermistor so that it is disposed within the fluid receiving port or at a location beyond the port, it is desired to provide a combined fluid pressure and temperature responsive sensor that is less costly to manufacture, one that is easier to assemble as well as one that is more robust while still having a short response time.

SUMMARY OF THE INVENTION

It is therefore an object of the present invention to provide a low cost, robust pressure and temperature sensor having an improved short period of response. Another object of the invention is the provision of such a sensor particularly adapted to measure pressure in the 6.5 psia to 1,000 psia range, and temperature in the −40 degree C. to 125 degree C. range for fluid applications. Yet another object of the invention is the provision of such a sensor that has superior environmental compatibility.

Briefly, in accordance with the preferred embodiment of the invention, a combined pressure responsive transducer and temperature sensor comprises a housing having a fluid pressure receiving port in fluid communication with a fluid pressure chamber. A variable capacitor having a rigid substrate and a flexible diaphragm are each provided with a capacitor plate on a respective face surface with the diaphragm attached to and spaced from the substrate and with the capacitor plates facing each other in aligned, spaced apart relation in a gap formed by a generally annular glass seal. The variable capacitor is disposed in the housing with the diaphragm exposed to the fluid pressure chamber. Electrical traces extend from the capacitor plates for connection with electrical pins extending through the substrate.

The opposite ends of the electrical pins are connected to signal conditioning circuitry disposed in an electric circuit chamber formed between the housing and the connector body which mounts transducer terminals also connected to the electric circuitry.

A temperature responsive element is mounted on the face surface of the diaphragm exposed to the fluid pressure chamber. First and second electric traces are connected to the temperature responsive element and extend along the diaphragm surface to and through openings in the diaphragm near its outer periphery aligned with the glass seal. According to a feature of the preferred embodiment of the invention, the temperature responsive element is a discrete SMT NTC (negative temperature coefficient of resistivity) thermistor placed on the diaphragm surface along with the electric traces and with a thin layer of polymer disposed over the diaphragm, the temperature responsive element and the first and second electric traces. The first and second electric traces extend through the openings in the diaphragm and are connected to other electrical pins extending through the substrate.

According to a further feature of the preferred embodiment, the temperature responsive element is positioned on the diaphragm so that it is aligned with the glass annular seal between the rigid substrate and the flexible diaphragm laterally beyond the active area of the diaphragm.

The fluid pressure receiving port comprises an open tubular member in fluid communication with the fluid pressure chamber and formed with an external thread for convenient installation in a fluid media system. A fluid flow diffuser received in the port has longitudinally extending walls separating the internal space of the tubular member into a passageway having a plurality of paths, preferably four, leading from a location external to the housing to the fluid pressure chamber. The fluid flow diffuser paths are oriented so that at least one is upstream relative to the fluid flow and serves as a path bringing fluid flow up to the fluid pressure chamber and across the temperature responsive element and at least one that is downstream that serves as a return path bringing the fluid back to the fluid media source.

BRIEF DESCRIPTION OF THE DRAWINGS

Other objects, advantages and details of the novel and improved combined pressure and temperature sensor apparatus of the invention appear in the following detailed description of the preferred embodiment of the invention, the detailed description referring to the drawings in which:

FIG. 3 is a perspective view of the capacitive transducer used in the FIG. 1 structure and shows the face surface of the diaphragm with the temperature responsive element attached thereto;

FIG. 4 is a perspective view similar to FIG. 3 but showing the opposite substrate face surface of the transducer showing the several electrical pins extending from that surface; and FIG. 5 is a perspective view of the diffuser used in the FIGS. 1, 2 sensor.

DETAILED DESCRIPTION OF THE PREFERRED EMBODIMENT

Figure 1:
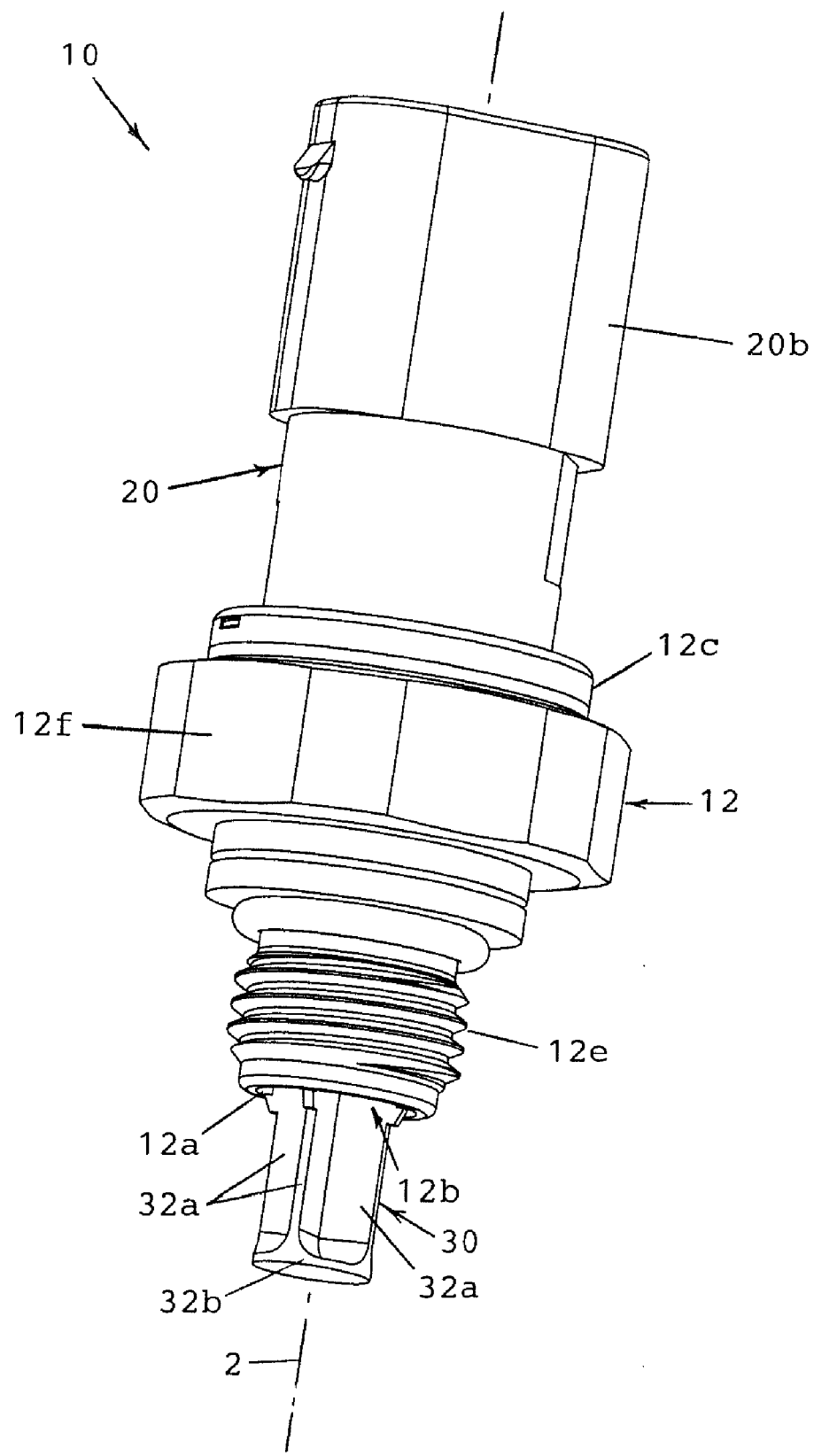
FIG. 1 is a perspective elevational view of a combined sensor made in accordance with the invention.
Figure 2:
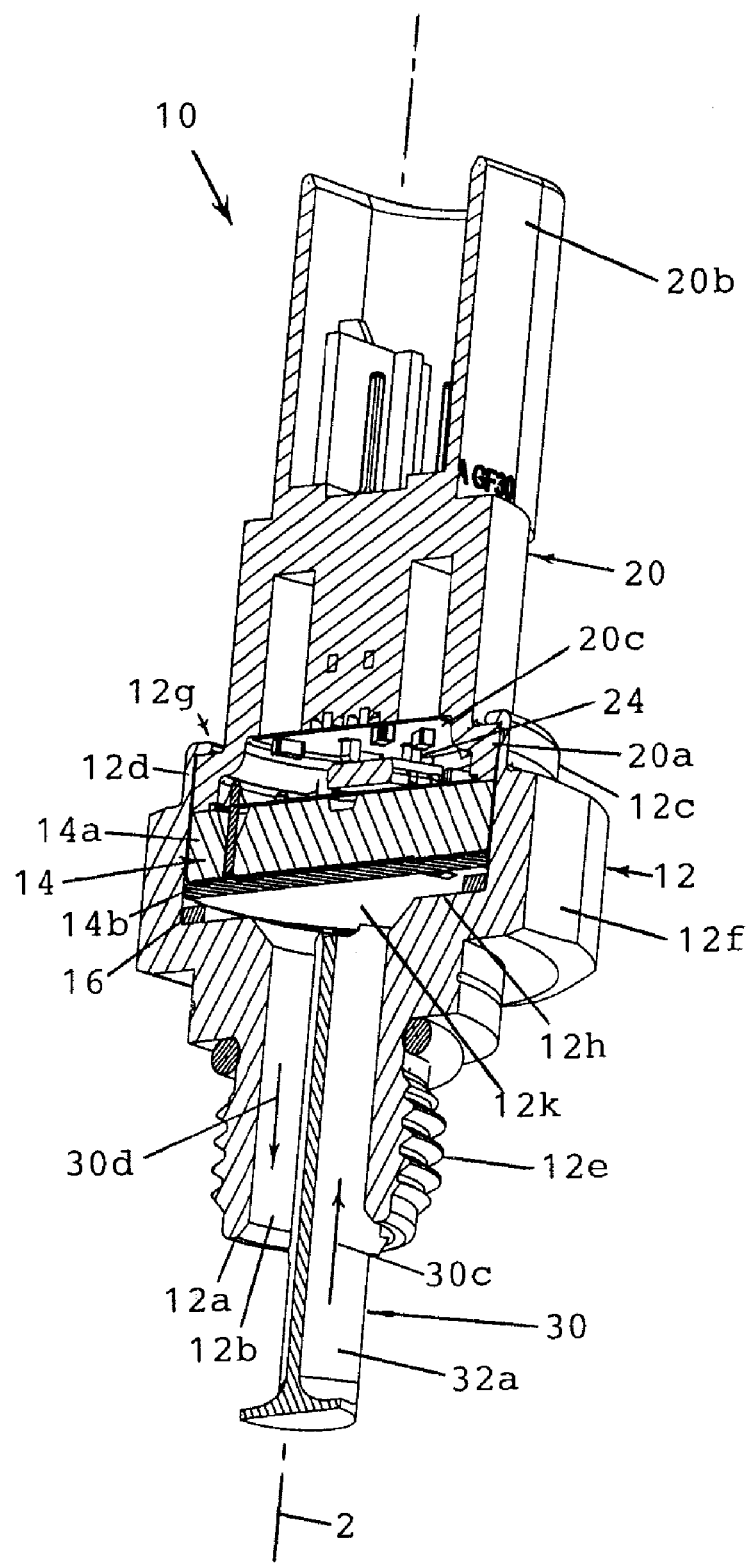
FIG. 2 is a cross section of a perspective elevational view of the FIG. 1 sensor.

Referring to FIGS. 1 and 2 of the drawings, a combined fluid pressure and temperature sensor 10 made in accordance with the preferred embodiment of the invention comprises a housing 12 made of suitable material, such as zinc coated steel, having a first end 12a formed with a fluid receiving port 12b extending along a longitudinal axis 2 and an opposite second end 12c formed on the axis with an open end forming a chamber 12g defined by an attenuated tubular wall 12d for clamping engagement with a connector, to be discussed. Housing 12 is formed with an external thread 12e at the first end for coupling to a fluid pressure source to be monitored. Male polygonal surface 12f is formed on the housing intermediate to the first and second ends to facilitate the installation and removal of the sensor to and from a coupling member of the fluid pressure source.

A variable capacitor 14 having a substrate portion 14a and a flexible diaphragm 14b attached to the substrate in spaced apart, sealed relation is received in chamber 12g of the housing with a fluid sealing gasket 16 of suitable material such as fluorosilicone forming a fluid pressure chamber 12k with a face surface of diaphragm 14b exposed to the fluid pressure chamber. Spacing of the ceramic sense element relative to the housing is controlled via the crimping process of tubular wall 12d to be discussed (control of force/displacement).

An electrically insulative connector 20 has an end 20a formed with a radially outwardly extending circumferential flange received in the open end so that attenuated wall 12d of the housing can be deformed inwardly to clampingly engage the connector, as shown in FIG. 2. Connector 20 mounts, as by insert molding, a plurality of connector terminals 22 which extend from a location within a shroud 20b into a recessed electric circuit chamber 20c for electrical connection with signal conditioning circuit 24 such as that disclosed in U.S. Pat. No. 4,982,351, the subject mater of which is incorporated herein by this reference, and to which reference may be had for a description of the operation of the circuitry. The connector provides a convenient electrical interface to power the sensor and transmit the pressure and temperature signals to the monitoring system.

With particular reference to FIGS. 3 and 4, variable capacitor 14 comprises a generally circular, rigid, disc shaped member formed of suitable electrically insulative material, such as ceramic. Flexible diaphragm 14b, also a generally circular member preferably formed of the same material as substrate 14a and having a matching outer periphery is attached to substrate 14a in spaced apart relation, preferably by means of a glass seal pattern. Capacitor plates (not shown) of suitable electrically conductive material are disposed on facing surfaces of the substrate and diaphragm and are electrically connected, along with a conventional guard ring (not shown), to electrically conductive pins 26a, 26b, 26c, extending through the substrate into the glass seal area by suitable electric traces and conductive epoxy or the like shown and described in U.S. Pat. No. 5,974,893, referenced above.

As shown in FIG. 3, a temperature responsive sensor in the form of a thermistor 28a of suitable material such as a discrete SMT NTC (negative coefficient of resistivity) type, is attached to the face surface of diaphragm 14b that is exposed to the fluid pressure chamber. Preferably the thermistor is located at a position on the diaphragm that is laterally spaced from the active part of the diaphragm, that is, aligned with the peripheral glass seal as show in FIG. 3, the inside diameter of the seal being indicated by dashed line 14c. First and second conductive traces or leads 28b, 28c, are also applied to the diaphragm's exposed face surface and extend from spaced apart portions of thermistor 28a to a location aligned with the glass seal pattern attaching the diaphragm and substrate together. At that location respective bores are formed to enable electrical connection between the leads and electrical pins 26d, 26e respectively by suitable means such as conductive epoxy. A thin layer of polymer (Teflon, polyamide or epoxy based) 28g is placed over the exposed face surface of the diaphragm, thermistor 28a and leads 28b, 28c, to protect the temperature sensor from the fluid media rendering the sensor insensitive to any corrosivity of the fluid media and without significant degradation of the response time of the temperature sensor or significant degradation of the sensitivity of the flexivity of the pressure sensor diaphragm. The thermistor 28a may also be formed of thick film, if desired. Further, the protective layer 28g may be formed of a thin layer of glass rather than polymer.

A fluid flow diffuser 30 of suitable material, such as plastic or metal, is disposed in fluid receiving port 12b in order to improve fluid flow across the temperature responsive sensor to increase both the accuracy and the response time of the sensor. Fluid flow diffuser 30 comprises a fluid flow passage formed by longitudinally extending walls 32a that extend from the bottom wall 12h of the fluid pressure chamber down through the tubular port or coupling member to a location beyond first end 12a of the housing and forming a plurality of paths, preferably four, so that regardless of orientation in the fluid flow, at least one path will face the upstream side of the fluid flow while at least one other path will face the downstream side. An end wall 32b that lies in a plane generally perpendicular to the longitudinal axis, along with the opening of the port at 12b serve as an entrance to an upstream first path 30c (see arrows in FIG. 2) leading from a location outside the housing up to the fluid pressure chamber 12k and a downstream second path 30d leading from fluid pressure chamber 12k to a location outside the housing.

Thus the provision of protective layer 28g allows the minimization of the thermal mass of the temperature sensor by obviating the need for a thick epoxy protective coating or the like and without concern of corrosivity of the fluid media. The provision of diffuser 30 results in optimum fluid flow of the media up to and across temperature sensor 28. These features provide faster response time of the temperature sensor with improved accuracy in a device that is robust and readily manufacturable.

The sensor functionality at the high and low ends of a particular application, for example, a range of Reynolds numbers 500 to 10000, is extremely sensitive to the geometry of the diffuser and coupling in which it is located. At low flow rates, e.g., Re 500, temperature response is poor so ideally a large diffuser and opening should be provided to divert a large amount of fluid up into the fluid pressure chamber 12k. On the other hand, at high flow rates, e.g., Re 10000, pressure error due to the dynamic component of a dense flowing fluid requires a small diffuser for minimal flow disturbance. For the 500-10000 range of Reynolds numbers the optimum geometry of the sensor, with reference to FIG. 5, is as follows: port or tubular coupling inside diameter (dia) of 8 mm, diffuser width (w) of 7 mm and diffuser length beyond the coupling (1) of 10 mm.

For another application, for example, for a small engine with lower oil flow rates, different diffuser/coupling geometry would need to be employed for optimum results.

The diffuser enables highly integrated temperature and pressure sensor technology independent of temperature sensor technology, i.e., NTC, PTC, RTD and the like, as well as pressure sensor technology, i.e., piezo-resistive, capacitive ceramic, piezo-resistive metal strain gauge. Minimization of the temperature sensor in conjunction with good thermal isolation provides improved temperature response time and good thermal accuracy in a device that is both reliable and robust.

It should be understood that although a preferred embodiment has been described by way of illustrating the invention, the invention includes all modifications and equivalents of the disclosed embodiment falling within the scope of the invention. For example the flow diffuser is shown defining a passageway having straight paths leading to and from the fluid pressure chamber, the passage could also be formed so that the paths are curved, such as helical, if desired, as long as the fluid is caused to flow across the temperature responsive sensor. It is also within the purview of the invention to increase thermal isolation of the capacitive sensor 14 from housing 12 by providing thermal insulation between the capacitor and the side wall of housing 12 by a sleeve of thermal insulative material or by increasing the diameter of the chamber 12g and providing spacing fingers to position the capacitor. Further, it is also within the purview of the invention to use the flow diffuser with other technologies for temperature and pressure sensing, as noted in the above immediately preceding paragraph.

Although the invention has been described with regards to a specific preferred embodiment thereof, variations and modifications will become apparent to those of ordinary skill in the art. It is therefore the intent that the appended claims be interpreted as broadly as possible in view of the prior art to include all such variations and modifications.

What is claimed:

1. Combined fluid pressure and temperature sensor apparatus comprising:
   a housing having a longitudinal axis and first and second ends disposed along the axis, a fluid receiving port disposed at the first end, a fluid pressure chamber formed in the housing with the port in fluid receiving communication therewith, a tubular wall formed at the second end of the housing forming an open end,
   a fluid pressure sensor, the pressure sensor having a substrate and a relatively flexible diaphragm, each having an outer periphery, both the substrate and the diaphragm formed of electrically insulative material, the diaphragm disposed on the substrate and attached thereto by a glass seal therebetween located adjacent to the outer peripheries of the substrate and diaphragm, the fluid pressure sensor disposed in the sensor housing with a face surface of the diaphragm exposed to the fluid pressure chamber,
   an electrically insulative connector body attached to the open end of the housing, an electric circuit chamber formed between the connector body and the substrate, a signal conditioning electric circuit received in the electric circuit chamber, electric terminals mounted in the connector body extending into the electric circuit chamber and being connected to the signal conditioning electric circuit, electric pins extending through the substrate aligned with the glass seal and having one end electrically connected to the signal conditioning circuit, the other end of the at least some pins electrically connected to the pressure sensor,
   a temperature responsive element disposed on the said face surface of the diaphragm exposed to the fluid pressure chamber, first and second leads electrically attached to spaced portions of the element formed on the said face surface of the diaphragm, the first and second leads extending through the diaphragm and being electrically connected to other respective electric pins extending through the substrate,
   the fluid pressure receiving port having a longitudinally extending tubular portion extending from the first end of the housing and being formed with a fluid flow diffuser, the fluid flow diffuser having at least one first path leading from the first end to the fluid pressure chamber and at least one second path leading from the fluid pressure chamber to the first end of the housing whereby fluid is directed through the at least one path into engagement with the temperature responsive resistive element and back through the at least one second path.

2. Combined fluid pressure and temperature sensor apparatus according to claim 1 further comprising a protective layer of corrosion resistant material over said face surface of the diaphragm exposed to the fluid pressure chamber, said temperature responsive element and said first and second leads.

3. Combined fluid pressure and temperature sensor apparatus according to claim 2 in which the corrosion resistant material is glass.

4. Combined fluid pressure and temperature sensor apparatus according to claim 2 in which the corrosion resistant material is a polymer.

5. Combined fluid pressure and temperature sensor apparatus according to claim 1 in which said longitudinally extending portion includes at least one longitudinally extending wall disposed within said tubular portion to form the first and second path.

6. Combined fluid pressure and temperature sensor apparatus according to claim 5 in which the at least one longitudinally extending wall extends beyond the tubular portion of the fluid pressure receiving port.

7. Combined fluid pressure and temperature sensor apparatus according to claim 1 in which the temperature sensor is aligned with the glass seal between the substrate and the diaphragm.

8. Combined fluid pressure and temperature sensor apparatus according to claim 6 particularly for use with fluids having a Reynolds number in a range between 500 and 10000 in which said longitudinally extending portion is a generally tubular portion having four longitudinally extending paths, the inside diameter of the tubular portion being approximately 8 mm, the at least one longitudinally extending wall extending beyond the tubular portion by approximately 10 mm and the width of the diffuser being approximately 7 mm.

9. Combined fluid pressure and temperature sensor apparatus according to claim 1 in which the temperature responsive element is a coating of thermistor material.

10. Combined fluid pressure and temperature sensor apparatus comprising:
   a housing forming a fluid pressure chamber and having a tubular coupling formed with an open end, the tubular coupling being connectable to a fluid pressure source and serving as a fluid receiving port,
   a fluid pressure sensor having a relatively flexible diaphragm disposed in the housing with the flexible diaphragm exposed to the fluid pressure chamber,
   a temperature responsive element disposed on said face surface of the diaphragm exposed to the fluid pressure chamber, the tubular coupling extending along a longitudinal axis, a fluid flow diffuser passage disposed in the tubular coupling and having at least one first path leading from the open end of the tubular coupling to the fluid pressure chamber and at least one second path leading from the fluid pressure chamber to the open end of the tubular coupling whereby fluid is directed through the first path into engagement with and across the temperature responsive resistive element and back through the at least one second path, and
   circuit means coupled to the capacitive fluid pressure sensor and the temperature responsive element.

11. Combined fluid pressure and temperature sensor apparatus according to claim 10 in which the temperature responsive element is a thermistor.

12. Combined fluid pressure and temperature sensor apparatus according to claim 10 further comprising a thin protective layer of material disposed over the face surface of the diaphragm exposed to the fluid pressure chamber and said temperature responsive element.

13. Combined fluid pressure and temperature sensor apparatus according to claim 10 in which the fluid flow diffuser is formed by at least one longitudinally extending wall disposed in the tubular coupling separating the at least one first path from the at least one second path.

14. Combined fluid pressure and temperature sensor apparatus according to claim 13 in which the at least one longitudinally extending wall extends beyond the open end of the tubular coupling.

15. Combined fluid pressure and temperature sensor apparatus according to claim 14 in which the tubular coupling has an internal diameter of approximately 8 mm and the longitudinally extending wall extends approximately 10 mm beyond the open end of the tubular coupling.

16. Combined fluid pressure and temperature sensor apparatus according to claim 14 in which the at least one longitudinally extending wall extends to a distal end and further comprising a wall lying in a plane generally normal to the longitudinal axis attached to the at least one longitudinally extending wall at the distal end.

\* \* \* \* \*